(12) United States Patent
Kawamura et al.

(10) Patent No.: US 7,232,530 B2
(45) Date of Patent: Jun. 19, 2007

(54) PLASMA DISPLAY DEVICE AND PRODUCTION METHOD THEREFOR

(75) Inventors: Hiroyuki Kawamura, Osaka (JP); Mitsuhiro Otani, Osaka (JP); Masaki Aoki, Osaka (JP); Kazuhiko Sugimoto, Kyoto (JP); Junichi Hibino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 251 days.

(21) Appl. No.: 10/476,691

(22) PCT Filed: Dec. 20, 2002

(86) PCT No.: PCT/JP02/13360

§ 371 (c)(1), (2), (4) Date: Nov. 5, 2003

(87) PCT Pub. No.: WO03/056596

PCT Pub. Date: Jul. 10, 2003

(65) Prior Publication Data

US 2004/0239245 A1  Dec. 2, 2004

(30) Foreign Application Priority Data

Dec. 25, 2001  (JP) ............................. 2001-391453

(51) Int. Cl.
*C09K 11/59*  (2006.01)
*H01J 9/227*  (2006.01)

(52) U.S. Cl. .................... 252/301.4 F; 427/64; 427/68; 427/157; 252/301.36; 313/582; 313/584

(58) Field of Classification Search ...................... None
See application file for complete search history.

(56) References Cited

U.S. PATENT DOCUMENTS

| 4,925,703 A |   | 5/1990 | Kasenga et al. |
| 5,196,234 A | * | 3/1993 | Taubner et al. ............ 427/213 |
| 5,783,107 A |   | 7/1998 | Morell et al. |
| 6,099,753 A | * | 8/2000 | Yoshimura et al. ... 252/301.4 R |
| 6,547,617 B1 | * | 4/2003 | Kawamura et al. ........... 445/24 |

FOREIGN PATENT DOCUMENTS

| JP | 6-273425 |   | 9/1994 |
| JP | 10-195428 |   | 7/1998 |
| JP | 11-86735 | * | 3/1999 |
| JP | 11-293239 |   | 10/1999 |
| JP | 2000-87030 | * | 3/2000 |
| JP | 2000-230173 | * | 8/2000 |
| JP | 2000-345091 |   | 12/2000 |
| JP | 2001-187884 |   | 7/2001 |
| JP | 2001-236893 |   | 8/2001 |
| WO | WO 00/03408 | * | 1/2000 |

OTHER PUBLICATIONS

Phosphor Handbook, published from Ohm Co., Ltd., Dec. 25, 1987 with a partial translation, pp. 219-220.

Hidenori Ito et al., "Charging Tendency of Phosphors and Blackening Phenomena in Fluorescent Lamps", issued by Lighting Academic Society, vol. 76, No. 10, 1992 with a partial translation, pp. 16-22.

* cited by examiner

*Primary Examiner*—C. Melissa Koslow
(74) *Attorney, Agent, or Firm*—Wenderoth, Lind & Ponack, L.L.P.

(57) ABSTRACT

A method of manufacturing a plasma display device which prevents the brightness of a phosphor layer from lowering is disclosed, and the method can form the phosphor layer in a stable manner because a nozzle is free from clogging. At least one of the phosphor layers has a green phosphor layer containing green phosphor having zero or positive charges and a crystal structure of $Zn_2SiO_4:Mn$. Green phosphor ink, whose major ingredient is the green phosphor, is applied through the nozzle to discharging cells, thereby forming the green phosphor layer. The green phosphor ink is formed of green phosphor powder coated with an oxide having positive charges, or the ink is formed by crushing the green phosphor powder originally having negative charges and a crystal structure of $Zn_2SiO_4:Mn$ such that the powder changes to have positive charges.

3 Claims, 4 Drawing Sheets

PLASMA DISPLAY DEVICE AND PRODUCTION METHOD THEREFOR

TECHNICAL FIELD

The present invention relates to a plasma display device including phosphor layers that are excited by ultraviolet rays for light emission.

PRIOR ART

Among other color display devices employed for displaying images in computers and television receivers, a plasma display panel (hereinafter referred to simply as a PDP) has drawn attention because the PDP can achieve a large size color-display device with a light weight and in a slim body.

The PDP can display an image in full colors by the additive color mixture of three primary colors (red, green, and blue). For displaying a full-color image, the PDP is equipped with phosphor layers that emit three primary colors, namely red, green and blue. The phosphor layer is formed of phosphor particles, which are excited by ultraviolet rays generated in discharging cells of the PDP, thereby producing visible lights of each one of the three primary colors.

The phosphor is made of such chemical compounds as; $(Y, Gd)BO_3:Eu^{3+}$, $Y_2O_3:Eu^{2+}$, and $Y_2O_3:Eu^{3+}$ for illuminating in red, $Zn_2SiO_4:Mn^{2+}$ for green, and $BaMgAl_{10}O_{17}:Eu^{2+}$ for blue. The phosphor is manufactured by mixing given materials, and baking the mixture at over 1000° C. for solid phase reaction. (For instance, refer to "Phosphor Handbook" pages 219-220 published by Ohm Co. Ltd.) The phosphor particles obtained from this baking are lightly crushed, i.e., just breaking up cohesion of particles, but not to break a crystal, then the particles broken up are sifted out before use. (average particle diameter of red, green: 2 μm-5 μm, and that of blue: 3 μm-10 μm).

The reason why light break-up and sift-out are needed is this that in the case of forming a phosphor layer on a PDP, a screen printing method or an ink-jet method is generally used. The screen printing method is prints pasted phosphor-particles of respective colors on the PDP, and the ink-jet method is to ejects the paste from a nozzle and coats the PDP with the paste (disclosed in Japanese Patent Application Non-Examined Publication H06-273425). If the particles are not lightly crushed or sifted out, a cohesion of a rather large size still remains in the phosphor, so that the pasted phosphor including the cohesion incurs an uneven coated-surface or causes a nozzle to be clogged. The phosphor having undergone the light crush and sift-out has a narrow particle-size distribution, particles of smaller diameters and homogenous particle-size, so that it can produce the better coated-surface. In other words, phosphor particles having the smaller diameters and being closer to sphere in a homogenous shape can produce a better coated-surface. This preparation improves a filling density of phosphor particles in the phosphor layer, increases a light-emission surface area of the particles, and improves unstableness in address driving. A brightness of the PDP can be thus increased in theory.

However, in the case of green phosphor formed of $Zn_2SiO_4:Mn$, the ratio of ZnO vs. $SiO_2$ is 1.5 $ZnO/SiO_2$, which is greater than theoretical mixture ratio of 2 $ZnO/SiO_2$, namely, the green phosphor includes a greater amount of $SiO_2$ than the theoretical amount. Therefore, the crystal-face of $Zn_2SiO_4:Mn$ is covered with $SiO_2$, and the phosphor surface is negatively charged. (Refer to "Phosphor Handbook," pages 219-220, published by Ohm Co., Ltd.)

In general, when the green phosphor of a PDP is negatively charged, it is known that discharging characteristics degrade (e.g., Japanese Patent Application Non-Examined Publication No. H11-86735, and No. 2001-236893). When this negatively charged green-phosphor ink is sequentially applied through a small-diameter nozzle, i.e., by the ink-jet application method, clogging in the nozzle or an uneven application is expected. The cause of the clogging and uneven application is that ethyl cellulose, among others, included in the green-phosphor ink, is hard to stick to the surface of negatively charged $Zn_2SiO_4:Mn$.

Further, the negatively charged phosphor incurs collisions of positive (+) ions of Ne or positive (+) ions of CH-system, those ions occurring in electrical discharge, against the green phosphor negatively charged, thereby lowering the brightness of the phosphor.

In order to change the negatively charged surface of $Zn_2SiO_4:Mn$ to a positively charged one, the following methods are disclosed:

Japanese Patent Application Non-Examined Publication No. H11-86735 discloses that the surface is coated with some oxide that is positively charged in a certain thickness (0.1 wt %-0.5 wt %).

Japanese Patent Application Non-Examined Publication No. 2001-236893 discloses that the negatively charged phosphor is mixed with green phosphor that is positively charged for making the phosphor positively charged seemingly. However, coating in thickness not less than 0.1 wt % causes the brightness to lower, and an application of two kinds of phosphors in different charged statuses tends to cause clogging or an uneven coated-surface.

The present invention addresses the foregoing problems, and aims to prevent the phosphor from lowering its brightness as well as eliminate the clogging or uneven coated-surface when the phosphor is applied.

SUMMARY OF THE INVENTION

The present invention relates to a method of manufacturing a plasma display including a plasma display panel which comprises the following elements:

plural discharging cells, having one color or plural colors, arranged; and phosphor layers of respective colors corresponding to each one of the discharging cells;

where phosphors forming the phosphor layer are excited by ultraviolet rays to emit light.

More particularly, the present invention relates to a method of manufacturing a green phosphor layer, where green phosphor ink, of which a major ingredient is green phosphor, is ejected from a nozzle and applied to the discharging cells for forming the green phosphor layer. At least one of the phosphor layers includes the green phosphor layer having a crystal structure of $Zn_2SiO_4:Mn$ being positively or zero charged. The green phosphor ink is formed of a mixed liquid which comprises the following elements:

(1) either one of phosphor powder coated with an oxide that is positively charged and having a crystal structure of $Zn_2SiO_4:Mn$, or (2) a phosphor powder that is negatively charged and having a crystal structure of $Zn_2SiO_4:Mn$, crushed such that the crystal face is broken up and the negative charges are changed to positive charges;

a resin component formed of ethyl cellulose; and a solvent component formed of at least one of terpineol, butyl carbitol-acetate and pentanediol.

The foregoing structure allows a uniformly applied film to be produced, and when the ink is ejected from the nozzle, the

DETAILED DESCRIPTION OF THE INVENTION

Figure 1:
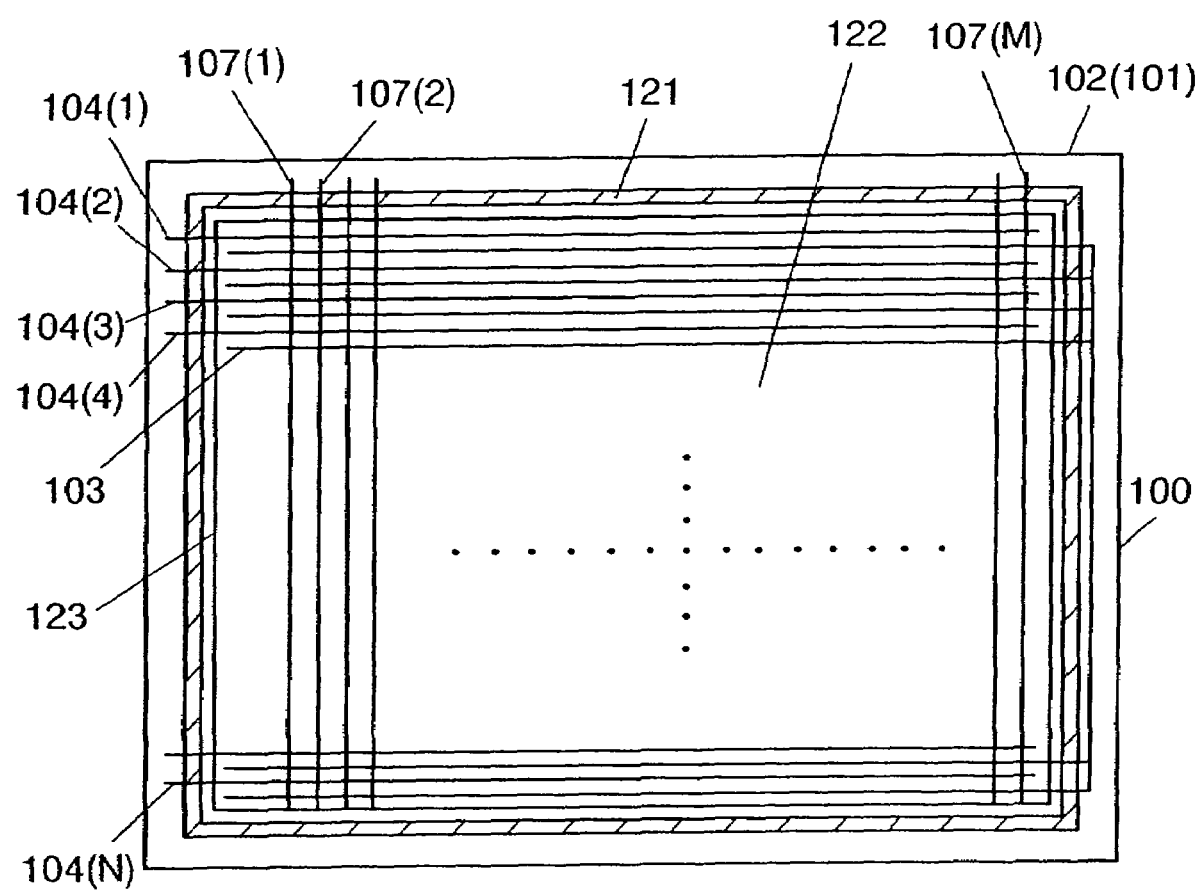
FIG. 1 is a plan view illustrating a PDP, with its front glass-plate removed, in accordance with a first exemplary embodiment of the present invention.

Green phosphor of $Zn_2SiO_4$:Mn employed in PDPs is manufactured by the solid-phase reaction method, and the amount of $SiO_2$ greater than theoretical mixture ratio is used for increasing the brightness, so that the crystal-face of $Zn_2SiO_4$:Mn is covered with $SiO_2$. If the green phosphor is manufactured following the theoretical mixture ratio, and when the phosphor is baked at over 1100° C., the deposition of $SiO_2$ is seen on the surface of the phosphor. Thus the surface of $Zn_2SiO_4$:Mn is negatively charged at its surface, namely, the green phosphor is charged differently from blue phosphor and red phosphor that are positively charged. As a result, inconvenience occurs in the discharging characteristics.

The presence of negatively charged $SiO_2$ on the surface makes ethyl cellulose, which is negatively charged in solution, hard to adhere to $Zn_2SiO_4$, so that the ethyl cellulose tends to separate from the phosphor in a tank of an applicator when the applicator ejects the ink from the nozzle. The separated ethyl cellulose coheres with each other, or the phosphor separated from the ethyl cellulose deposits around the nozzle and causes the clog.

When the panel is discharging, a neon-ion ($Ne^+$) and a hydrocarbon plus-ion generated in the plasma collide with the green phosphor particles that are negatively charged, thereby lowering the brightness of the green phosphor. Thus, if the surface of the green phosphor can be charged positively or null (zero charged), the foregoing problems can be overcome. The present invention adopts the following two methods to make the crystal-face of $Zn_2SiO_4$:Mn positively or zero charged: (1) crush the $Zn_2SiO_4$, and (2) coat the crystal-face lightly with an oxide having plus electric charges, in order to improve the deterioration in brightness of the green phosphor. the present invention also reduce errors in address-discharge (improving the discharge characteristics), and reduce clogs in nozzles.

Next, a method of manufacturing the phosphor of the present invention is demonstrated hereinafter. There are the following several conventional methods of manufacturing the phosphor: (a) a solid phase reaction method using oxide, carbonation materials, and flux; (b) a liquid phase method which uses the coprecipitation method of hydrolyzing organometallic salt and nitrate in a water solution or precipitating by adding alkali for producing a precursor of the phosphor before the precursor undergoes heat treatment; and (c) a hydraulic spray method of spraying water-solution, which contains the phosphor, into a heated oven. The phosphor manufactured by any one of the foregoing methods proves that the phosphor can improve the discharging characteristics and clogs in a nozzle provided that the phosphor of $(Zn_{1-x}Mn_x)_2SiO_4$ is positively charged.

An example of the methods of manufacturing positively charged green phosphor is described here, i.e., this method uses the solid phase reaction method, and produces the general green phosphor where $SiO_2$ is rich with respect to ZnO. First, prepare carbonation materials or oxide materials such as ZnO, $SiO_2$, $MnCO_3$ which are prepared where an amount of $SiO_2$ with respect to ZnO is greater than the molar ratio of $(Zn_{1-x}Mn_x)_2SiO_4$, which is the base material of the phosphor (molar ratio of ZnO vs. $SiO_2$=2:1 in the prepared materials). Then, mix those materials with each other, and bake the mixture at 1100° C.-1300° C. for 2 hours. Then, crush the baked mixture lightly enough not to break up the crystal-face and sift the crystals, thereby classing them into a particle diameter of 5-10 μm. Then, crush the lightly crushed material with a ball mill or a jet mill into a smaller diameter of 0.9-0.1 times that of the lightly crushed material, namely, 0.1 μm-4.5 μm. Next, anneal the finely crushed material at 400-1000° C. in nitrogen, nitrogen-oxygen, or nitrogen-water-vapor on an as needed base to produce the green phosphor. This annealing can recover the brightness which has been lowered by the crush, and is controlled in its atmosphere and temperature depending on the crushing time and an amount of negative charges. The reason why the annealing temperature is defined between 400° C. and 1000° C. is that annealing at a temperature lower than 400° C. cannot recover the brightness and annealing at a temperature over 1000° C. deposits $SiO_2$ on the crystal-face of $Zn_2SiO_4$, which charges the surface to have negative charges.

The liquid phase method, which produces phosphor by using a water solution, needs to prepare the following materials: prepare organometallic salt such as alkoxide, acetylacetone or nitrate, which contains phosphor ingredients, such as Zn, Si, and Mn, where the mixture ratio of Zn:Si is set at 2:1.5 that contains richer Si than the theoretical mixture ratio of Zn vs. Si=2:1. Then, dissolve this organometallic salt having the foregoing composition into water, and then hydrolyze the water solution to produce coprecipitation (hydration). Then, put the hydration in a hydrothermal synthesis process (crystallizing in autoclave), or bake the powder, which has been produced by spraying the hydration into a heated oven, at 1100-1300° C. for 2 hours in the air. Then, crush the product lightly enough not to break the crystal-face before sift-out. Next crush the sifted product with a ball mill or a jet mill such that the crystal-face is broken, and then put the finely crushed product in heat treatment in nitrogen or nitrogen-oxygen at 400-1000° C., thereby producing the green phosphor.

The lightly crushed phosphor, i.e., the phosphor before being crushed by the ball mill or the jet mill to break its crystal-face, is covered with negatively charged $SiO_2$ on the surface of $Zn_2SiO_4$:Mn. Thus, although a blow-off charge-measurement results in a negative charge, the phosphor having broken crystal-faces is measured to have a positive charge because $Zn_2SiO_4$ comes out on the surface. Thus, use of this phosphor for forming the green phosphor layer prevents the brightness deterioration and address errors, and also eliminates clogging in nozzles. The crystal-face is preferably broken up as small as 0.9-0.1 times of the particle diameter before the crush. A greater diameter than 0.9 times does not permit the phosphor to be charged positively, and a smaller diameter than 0.1 times lowers the brightness much more.

As discussed above, the green phosphor, having a composition where an amount of $SiO_2$ with respect to ZnO is greater than the theoretical mixture ratio of ZnO vs. $SiO_2$ is baked at 1100-1300° C. and crushed fine enough to break the crystal-faces, and then the crushed phosphor is annealed at 400-1000° C. in nitrogen or nitrogen-oxygen gas, thereby obtaining the green phosphor with its $Zn_2SiO_4$ particles charged to zero or positively.

Next, a method is described of coating $Zn_2SiO_4$:Mn with an oxide having positive charges in a thickness of not greater than 10 nm. First, prepare the powder of $Zn_2SiO_4$:Mn, and then mix it with organometallic compounds (alkoxide, acetylacetone, hydrogenated compound) which contain the materials (chemical elements) of positively charged MgO, ZnO, $Y_2O_3$, $Al_2O_3$, namely Mg, Zn, Y, Al. Then, disperse the mixture in a non-aqueous solution (non-aqueous alcohol, toluene, benzene) to have a film with a thickness not greater than 10 nm. Remove the solutions and bake the mixture at 400-1000° C.

The thickness of the coating is preferably over unimolecular not more than 10 nm. The coating thicker then 10 nm will lower the brightness, and the thickness less than unimolecular makes it difficult to change the charges to zero or positive.

As such, the phosphor, in which the surface of $Zn_2SiO_4$ Mn phosphor is positively or zero charged, is mixed with an organic binder, so that the phosphor ink is produced, and the ink is ejected from a nozzle for application. The phosphor layer thus produced does not cause clogging, but achieves a uniform coated film.

The green phosphor layer of the present invention is formed of the green phosphor of $(Zn_{1-x}Mn_x)_2SiO_4$, of which surface is charged to zero or positively, and of which a particle-size distribution is narrow. The particle diameter of the green phosphor ranges as small as from 0.1 μm to 3 μm, and the green phosphor has a narrow particle-size distribution. And yet, spherical particles of the phosphor would increase a filling density, thereby increasing a light emission area of the phosphor particles practically, so that the light emission practically increases. As a result, the brightness of a PDP can increase. Brightness deterioration and color shift are also suppressed, so that a PDP having excellent brightness characteristics can be obtained.

An average particle diameter ranges more preferably from 0.1 μm to 2.0 μm. The particle-size distribution ranges more preferably from the minimum value to not less than ¼ of the average to the maximum value not more than 4 times of the average. Ultraviolet rays can reach as shallow as several hundred nanometers from a surface of phosphor particles, so that only the surface seems to emit the light. A particle diameter of the phosphor not greater than 2.0 μm would increase a light emission area of the phosphor particles, so that the light emission practically increases, and the foregoing particle diameter can keep the phosphor layer in a highly efficient light-emission status. A particle diameter of the phosphor not smaller than 3.0 μm would need a phosphor thickness of not less than 20 μm, so that a discharging space cannot be sufficiently reserved. A particle diameter of the phosphor not greater than 0.1 μm would tend to incur defects, and would not increase the brightness.

If a thickness of the phosphor layer is as much as 8-25 times of the average phosphor-particle diameter, a sufficient discharging space can be prepared with the light-emission efficiency being kept at a high level. As a result, the brightness of a PDP can be increased. An average particle-diameter not greater than 3 μm, among others, produces this advantage much more than the other cases.

To be more specific, the phosphor particles used in the green phosphor layer of a PDP are formed of $(Zn_{1-x}Mn_x)_2SiO_4$ as a base material, and the electrical charge on the surface of this base material is turned to zero or positive charge by crushing the particles or coating the particles with oxide. A value of X of the foregoing base material is preferably set at $0.01X \leq 0.2$, so that a better brightness and smaller deterioration in brightness can be obtained.

Phosphor particles to be used in a blue phosphor-layer use a compound such as $Ba_{1-x}MgAl_{10}O_{17}:Eu_X$, or $Ba_{1-X-Y}Sr_YMgAl_{10}O_{17}:Eu_X$. The values of X and Y in those compounds are preferably set at $0.03 \leq X \leq 0.20$, $0.1 \leq Y \leq 0.5$ because those values can keep the brightness at a high level.

Phosphor particles to be used in a red phosphor layer use a compound such as $Y_2O_3:Eu_X$, or $(Y, Gd)_{1-x}BO_3:Eu_X$. The value of X of this compound is preferably set at $0.05 \leq X \leq 0.20$, so that a better brightness and smaller deterioration in brightness can be obtained.

A manufacturing method of the present invention comprises the following steps:
  preparing a paste including green phosphor particles formed of $(Zn_{1-x}Mn_x)_2SiO_4$ of which a electrical charge on the surface is zero or positive, red phosphor particles, blue phosphor particles and a binder;
  baking the paste for burning off the binder; and
  sealing the overlapped panels on which the phosphor particles are prepared by the baking.

This method allows a plasma display device to be produced which has a better brightness and a smaller deterioration in brightness.

Figure 2:
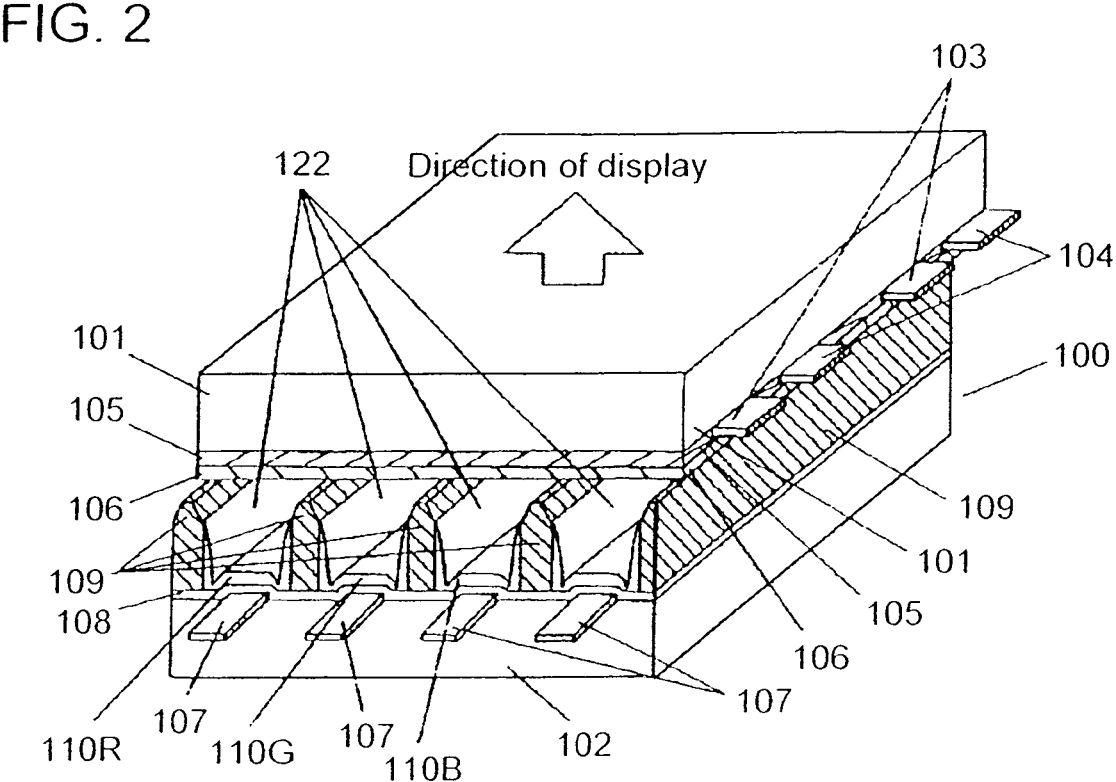
FIG. 2 shows a perspective view illustrating a structure of an image display area of the PDP shown in FIG. 1.

A plasma display device in accordance with an exemplary embodiment of the present invention is described hereinafter with reference to accompanying drawings. FIG. 1 is a schematic plan view of a PDP with its front glass plate removed, and FIG. 2 is a sectional and perspective view illustrating parts of an image display area of the PDP. In FIG. 1, the numbers of display electrodes, display scanning electrodes and address electrodes are partially omitted for better understanding.

As shown in FIG. 1, PDP 100 comprises the following elements:
  front glass plate 101 (not shown);
  rear glass plate 102;
  N pieces of display electrode 103;
  N pieces of display scanning electrode 104; (any number attached to electrode 104 represents the Nth electrode)
  M pieces of address electrode 107; (any number attached to electrode 107 represents the Mth electrode) and
  airtight sealing layer 121 indicated with oblique lines.

Respective electrodes 103, 104, and 107 form a 3-electrode matrix, and a cell is formed at junction points of electrode 104 and electrode 107. Discharging space 122 and image-display area 123 are available.

Figure 3:
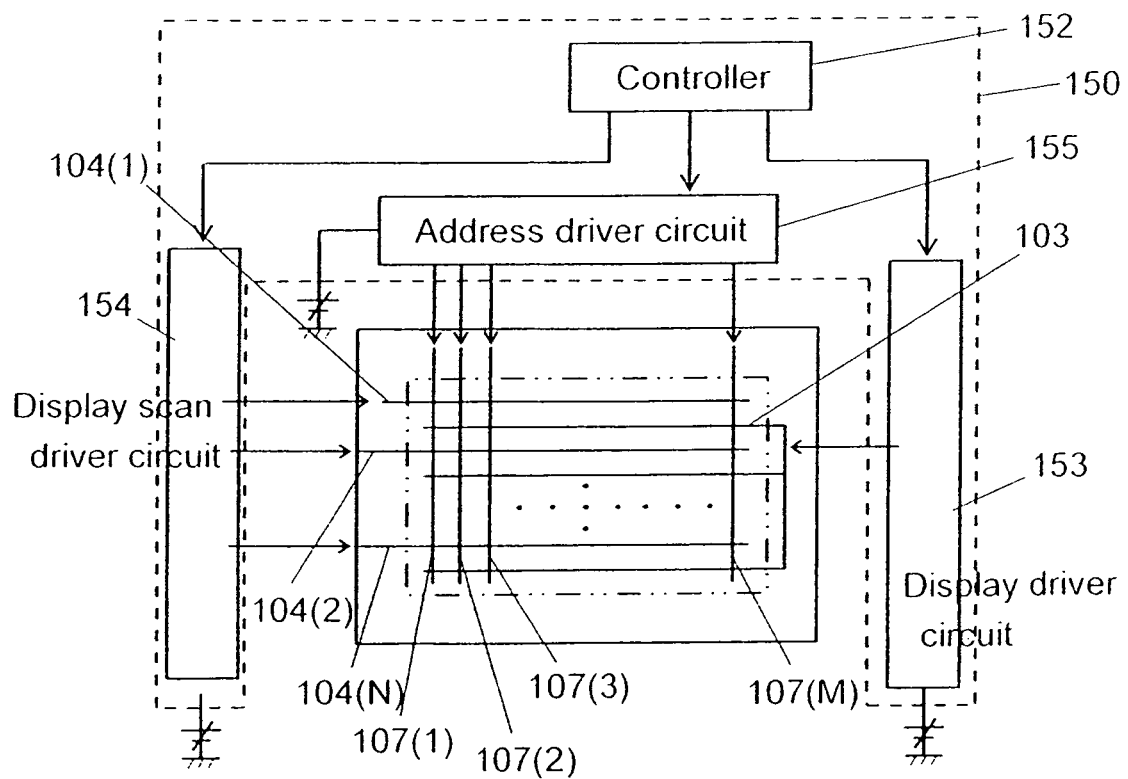
FIG. 3 is a block diagram of a plasma display device employing the PDP shown in FIG. 1.

A structure of PDP 100 is shown in FIG. 2. On a main face of front glass plate 101, a front panel is prepared, which comprises display electrodes 103, display scanning electrodes 104, dielectric glass layer 105 and protective film 106 made of MgO. On a main face of rear glass plate 102, a rear panel is prepared, which comprises address electrodes 107, dielectric glass layer 108, partition wall 109, and phosphor layers 110R, 110G, 110B. The front and rear panels thus formed are overlapped with each other, and discharge-gas is enclosed in discharging space 122 formed between the panels. As shown in FIG. 3, the PDP thus constructed is coupled to PDP driver 150 to work as a plasma display device.

When this plasma display device is driven, PDP 100 is coupled to display-driver circuit 153, display-scanning driver circuit 154, and address driver circuit 155, as shown in FIG. 3. Then at each one of the cells to be lighted following the control by controller 152, a voltage is applied to both of display-scanning electrode 104 and address electrode 107 for address discharging therebetween. Next, a pulse voltage is applied between display electrode 103 and display scanning electrode 104 for carrying out a maintaining discharge. This maintaining discharge generates an ultraviolet ray at the cell, thereby exciting the phosphor layer to emit the light, and lighting the cell. A combination of lighting cells and non-lighting cells of respective colors displays an image.

A method of manufacturing the PDP thus constructed is described hereinafter. First, the front panel is manufactured in the following way. Prepare N pieces of display electrodes 103 and display scanning electrodes 104 respectively on front glass plate 101 alternately and in parallel with each other to form a striped pattern (in FIG. 2, only two pieces of each are shown.) Then, put dielectric glass layer 105 as a cover on glass plate 101 thus prepared, and form protective film 106 made of MgO on the surface of glass layer 105. Display electrode 103 and display scanning electrode 104 comprise silver. Those electrodes are formed by applying silver paste to electrodes by the screen printing method, and baking the silver pasted electrode. Dielectric glass layer 105 is manufactured in the following way. Apply paste including lead-based glass material by the screen printing method, and bake it at a given temperature and for a given time, e.g., at 560° C. for 20 minutes, to form the dielectric glass layer of a given thickness (approx. 20 μm.) The paste including the lead-based glass material uses a mixture of e.g., PbO (70 wt %), $B_2O_3$ (15 wt %), $SiO_2$ (10 wt %), $Al_2O_3$ (5 wt %) and an organic binder (10% ethyl cellulose dissolved in α-terpineol). The organic binder is formed by dissolving resin in organic solvent. Acrylic resin can be used as the resin other than ethyl cellulose, and butyl carbitol can be used as the organic solvent. Further, dispersant such as glyceryl trileate can be mixed with the organic solvent. Protective film 106 comprises MgO, and is formed by sputtering or a CVD (chemical vapor deposition) method to have a given thickness (approx. 0.5 μm.)

On the other hand, the rear panel is manufactured in the following way. First, screen-print the silver paste, to be used for electrode, on rear-glass panel 102, and then bake it, thereby arranging M pieces of address electrodes 107 on plate 102. On top of that, apply the paste containing lead-based glass material by the screen-printing method, thereby forming dielectric glass layer 108. Then, apply the paste containing lead-based glass material by the screen-printing method at given pitches repeatedly, thereby forming partition wall 109. This partition wall 109 partitions discharging space 122 into individual cells (a unit of light-emission area) along the line.

Figure 4:
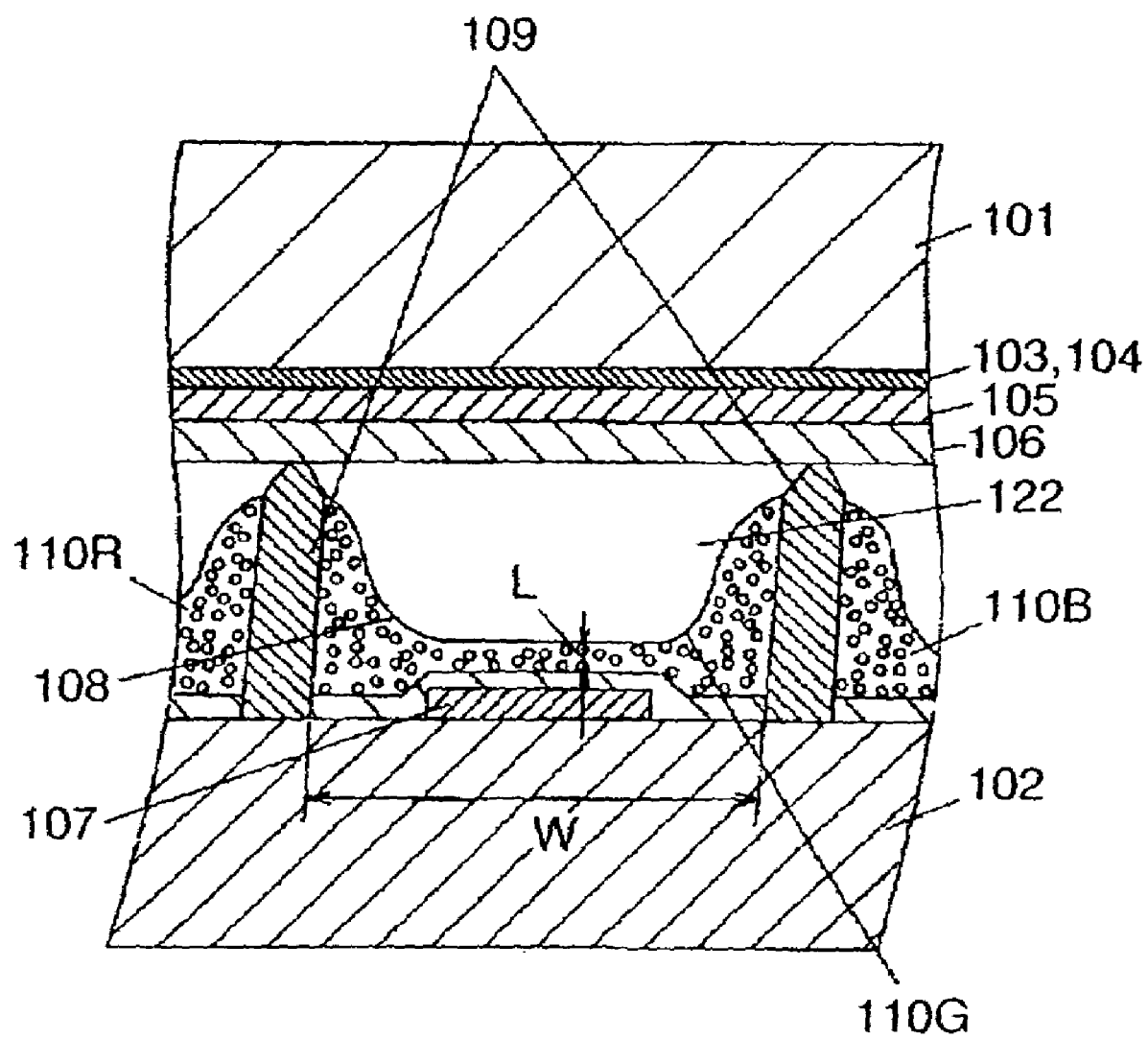
FIG. 4 is a sectional view illustrating the structure of the image display area of the PDP shown in FIG. 1.

FIG. 4 is a sectional view of a PDP, and as shown in FIG. 4, an interval between partition walls 109 is specified generally at 130 μm-240 μm following a given screen-size of HDTV, such as 32 inches-50 inches. Apply the pasted phosphor-ink to grooves between partition walls 109, where the ink comprising phosphor particles of respective colors, i.e., red (R), blue (B), green (G), and organic binder, and the surface of the green phosphor is charged to zero or positively. Then, bake the applied product at 400-590° C., thereby burning off the organic binder. As a result, respective phosphor-particles adhere to each other and form the phosphor layers 110R, 110G, and 110B. A thickness L of those layers above address electrode 107 is preferably set at approx. 8-25 times of the average particle-diameter of the phosphor particles of respective colors. In other words, those phosphor layers preferably have a thickness corresponding to a minimum 8 layers of phosphor-particle and more preferably 20 layers in order to obtain enough brightness (efficiency of light emission) in irradiating the phosphor layer with a given amount of ultraviolet ray, because the ultraviolet ray generated in the discharging space is preferably absorbed by the phosphor layer instead of permeating the layer. A thickness greater than that would substantially saturate the efficiency of light emission of the phosphor layer, and a thickness over 20 layers of phosphor particles could not reserve sufficient discharging space 122. If the phosphor particles produced by the hydrothermal synthesis method are used, a total surface area of the phosphor particles becomes greater and the filling density can be higher than those of non-spherical particles even if the same number of layers are prepared in both cases, because the hydrothermal synthesis method can produce spherical particles of small enough diameters. As a result, this method can increase a light emission area of the phosphor particles practically effecting the light emission, and the efficiency of light emission is further increased.

The front panel and the rear panel thus manufactured are overlapped with each other such that the respective electrodes on the front panel intersect the address electrodes of the rear panel at right angles. Then, a sealing glass is prepared at the peripheral of the panel, and is baked at approx. 450° C. for 10-20 minutes to form airtight sealing layer 121, so that both the panels are sealed. Discharging space 122 is temporarily evacuated to become a high vacuum, e.g., $1.1\times10^{-4}$ Pa, and then a charging gas such as He—Xe based, or Ne—Xe based inert-gas is filled by a given pressure, thereby producing PDP 100.

Figure 5:
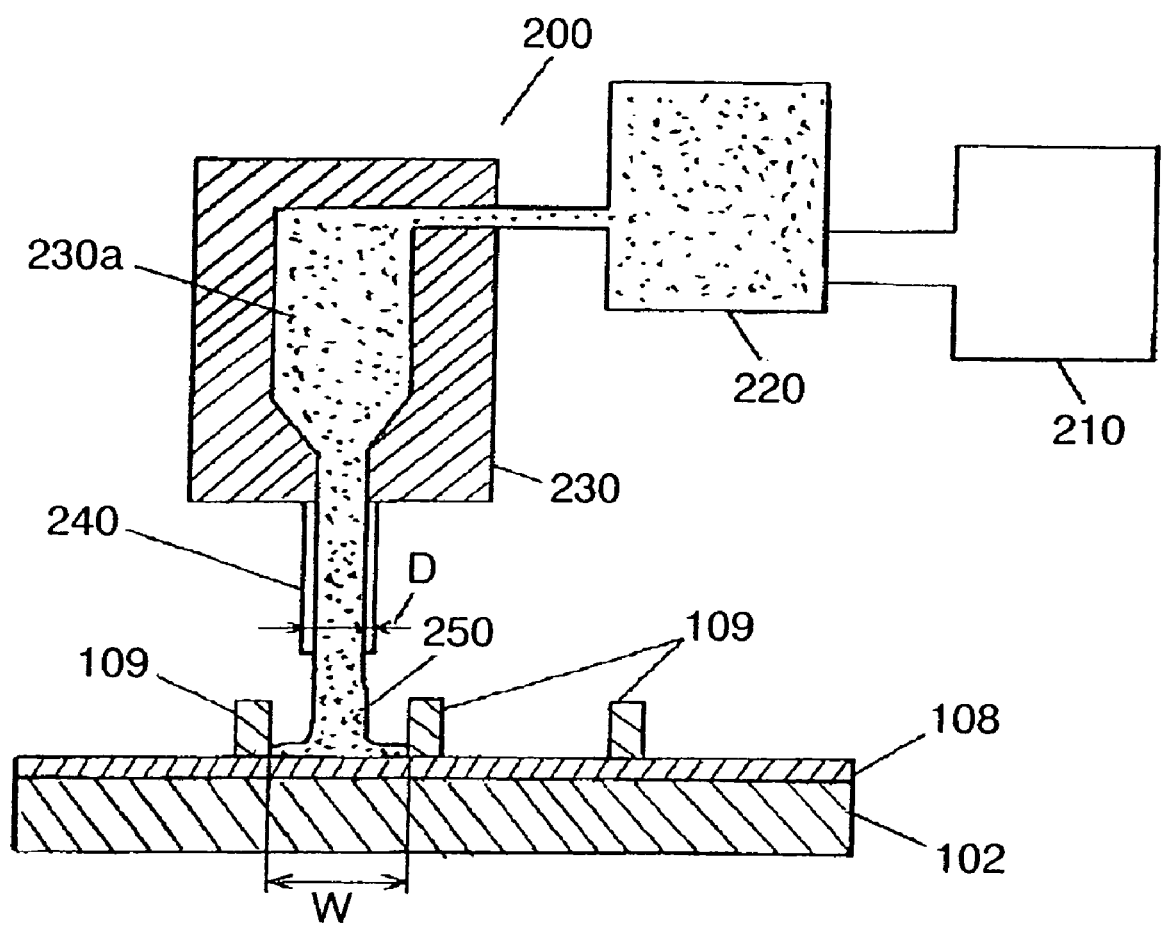
FIG. 5 shows a schematic diagram illustrating an ink applicator to be used for forming a phosphor layer of the PDP.

FIG. 5 shows a schematic structure of an ink applicator to be used for forming the phosphor layer. As shown in FIG. 5, ink applicator 200 comprises server 210, pressure pump 220 and header 230. The phosphor ink supplied from server 210 is pressurized by pressure pump 220 and supplied to header 230. Header 230 has ink-chamber 230a and nozzle 240. The pressurized ink is supplied to ink chamber 230a, and is then sequentially ejected from nozzle 240. Diameter D of nozzle 240 is preferably not smaller than 30 μm in order to avoid clogging, and is not greater than interval W (approx. 130-200 μm) between partition walls 109 in order to prevent the ink from squeezing out from the partition walls at application. Diameter D is generally set at 30-130 μm.

Header 230 is driven linearly by a header scanning mechanism (not shown), and scanning of header 230 together with ejecting of phosphor ink 250 sequentially from nozzle 240 allow the ink to be applied uniformly into the grooves between partition walls 109 on rear-glass plate 102. The viscosity of the ink is kept in the range of 1,500-50,000 centipoise (CP) at 25° C.

Server 210 is equipped with an agitator (not shown), which prevents the particles in the phosphor ink from being deposited. Header 230 together with ink-chamber 230a and nozzle 240 are molded in one piece, and produced by machining and electrical charging a metallic material.

The method of forming the phosphor layer is not limited to the methods discussed above, for instance, various methods such as photo-litho method, screen-printing method, and the method of arranging films in which phosphor particles are mixed, can be used.

The phosphor ink is manufactured by mixing phosphor particles of respective colors, binder and solvent, then blending the mixture to be at 1,500-50,000 CP, and adding surface-active agent, silica, or dispersant (0.1 wt %-5 wt %) if necessary.

The red phosphor to be blended in this phosphor ink uses a chemical compound such as $(Y, Gd)_{1-X}BO_3:Eu_X$, or $Y_{2-X}O_3:Eu_X$. In those chemical compounds, a part of Y element, which is one of the elements of the base material, is replaced with Eu, and the replacing amount X of element Eu with respect to element Y preferably falls within $0.05 \leq X \leq 0.20$. A greater replacing amount than this range would increase the brightness, although it would accelerate substantially the deterioration in brightness, so that it is hard to use this one practically. On the other hand, a smaller replacing amount than this X would lower the composition ratio of Eu, which is a major element for light emission, so the brightness would be lowered and the phosphor becomes useless.

The green phosphor uses a chemical compound such as $(Zn_{1-X}Mn_X)_2SiO_4$ whose surface is positively charged. In this compound, a part of Zn, which is one of the elements of the base material, is replaced with Mn. The replacing amount X of element Mn with respect to element Zn preferably falls within $0.01 \leq X \leq 0.20$.

The blue phosphor uses a chemical compound such as $Ba_{1-X}MgAl_{10}O_{17}:Eu_X$ or $Ba_{1-X-Y}Sr_YMgAl_{10}O_{17}:Eu_X$. In those compounds, a part of Ba, which is one of the elements of the base material, is replaced with Eu or Sr. The replacing amount X of element Eu with respect to element Ba preferably falls within $0.03 \leq X \leq 0.20$, for the first one and $0.1 \leq X \leq 0.5$ for the second one because of the same reason discussed above.

A method of synthesizing those phosphors will be described later.

The binder blended in the phosphor ink uses ethyl cellulose or acrylic resin (0.1 wt %-10 wt % of the ink), and the solvent uses α-terpineol or butyl carbitol. The binder can also use a high polymer such as PMA, PVA, and the solvent also can use an organic solvent such as diethylene glycol, methyl ether.

In this embodiment, the phosphor particles, manufactured by the solid-phase reaction method, water solution method, spray and bake method, or hydrothermal synthesis method, are used.

Methods of manufacturing the phosphors of respective colors are demonstrated hereinafter.

① Blue Phosphor

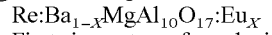
Re:$Ba_{1-X}MgAl_{10}O_{17}:Eu_X$

First, in a step of producing a mixed solution, mix the following materials: barium nitrate $Ba(NO_3)_2$, magnesium nitrate $Mg(NO_3)_2$, aluminum nitrate $Al(NO_3)_3$, europium nitrate $Eu(NO_3)_2$, at molar ratio of 1-X:1:10:X ($0.03 \leq X \leq 0.25$). Then, dissolve this mixture in an aqueous medium to produce the mixed solution. The aqueous medium preferably uses ion-exchanged water or pure water because they do not contain impurities, however, they are still usable if they contain a non-aqueous solvent such as methanol or ethanol.

Next, put hydration mixed liquid into a vessel made of a corrosion-resistant and heat-resistant material such as gold or platinum, and then use a device, which can pressurize and heat a subject at the same time, such as an autoclave, so that the hydration mixed liquid undergoes hydrothermal synthesis in the highly pressurized vessel at a given temperature (100° C.-300° C.) and at a given pressure (0.2 MPa-10 MPa) for 12-20 hours.

Then, bake the powder at, e.g., 1350° C., for 2 hours in reducing atmosphere, e.g., the atmosphere including 5% of hydrogen and 95% of nitrogen, and then classify the baked product, thereby obtaining the desirable blue phosphor of $Ba_{1-X}MgAl_{10}O_{17}:Eu_X$.

The phosphor particles obtained through the hydrothermal synthesis are spherical in shape, and an average particle-diameter is as small as 0.05 μm-2.0 μm, which is smaller than that of the particles manufactured by the conventional solid-phase reaction method. The "spherical shape" used in this embodiment defines the ratio of shorter axis vs. longer axis that falls within e.g., 0.9-1.0, however, all the particles do not necessarily meet this definition.

The foregoing hydration mixed liquid may not be put in the vessel made of gold or platinum, but the blue phosphor can be manufactured by the spray method, i.e., the hydration mixed liquid is sprayed from a nozzle into a heated oven.

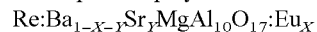
Re:$Ba_{1-X-Y}Sr_YMgAl_{10}O_{17}:Eu_X$

This phosphor is different in material from the foregoing $Ba_{1-X}MgAl_{10}O_{17}:Eu_X$ and is manufactured by the same solid-phase reaction method. The material of this phosphor is described hereinafter.

Weigh the following materials to be a molar ratio depending on necessity: barium hydroxide $Ba(OH)_2$, strontium hydroxide $Sr(OH)_2$, magnesium hydroxide $Mg(OH)_2$, aluminum hydroxide $Al(OH)_3$, and europium hydroxide $Eu(OH)_2$. Then, mix those materials with $AlF_3$ as a flux, and bake the mixture at 1300-1400° C. for 12-20 hours, thereby obtaining $Ba_{1-X-Y}Sr_YMgAl_{10}O_{17}:Eu_X$ of which Mg, Al are replaced with a 4-atomic ion. This method produces phosphor particles of which average diameter falls within 0.1 μm-0.3 μm.

Next, bake this phosphor in a reducing atmosphere, e.g., the atmosphere including 5% of hydrogen and 95% of nitrogen, at 1000-1600° C. for 2 hours, and then classify the baked product with an air classifier, so that the phosphor powder is manufactured. In this case, oxide, nitrate, and hydroxide are mainly used as the materials; however, an organometallic compound, e.g., alkoxide or acetylacetone, which contains chemical elements such as Ba, Sr, Mg, Al, and Eu, can be used as a material of the phosphor.

② Green Phosphor

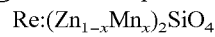
Re:$(Zn_{1-x}Mn_x)_2SiO_4$ (1) Charge Positively the $(Zn_{1-x}Mn_x)_2SiO_4$ by Crushing First, a solid-phase method is used. Mix zinc-nitrate $Zn(NO_3)_2$, silicon oxide $SiO_2$, manganese nitrate $Mn(NO_3)_2$, at a molar ratio of Zn vs. Mn=1-X:X ($0.01 \leq X \leq 0.20$). Then mix the materials at a molar ratio of $Zn_{1-x}Mn_x:SiO_2=2:3$. Bake this mixture at 1100-1300° C. for 2 hours. Next, crush lightly the baked product such that cohesion is just broken up, then classify the broken-up product into particles of 1 μm-15 μm diameter, so that green phosphor charged negatively is manufactured. Then crush this phosphor with a ball mill into particles of which average diameter falls within 0.1 μm-3 μm. Provide those particles with heat treatment at 400-1000° C. in nitrogen-oxygen, so that green phosphor charged positively is manufactured.

Second, the hydrothermal synthesis method is used. In the step of producing a mixed liquid, mix zinc-nitrate $Zn(NO_3)_2$ silicon oxide $SiO_2$, and manganese nitrate $Mn(NO_3)_2$, at a molar ratio of $Zn(NO_3)_2$ vs. $Mn(NO_3)_2=1-X:X$ ($0.01 \leq X \leq 0.20$). Then, mix the materials at a molar ratio of $Zn_{1-x}Mn_x:SiO_2=2:3$, which exceeds the theoretical mixture ratio in $SiO_2$, and put this mixture into ion-exchanged water to produce the mixed liquid. Next, in the hydration step, drop basic-water solution, e.g., ammonia water solution, into this mixed liquid, thereby forming hydration. Then, in the hydrothermal synthesis step, put this hydration and ion-exchanged water into a capsule made of a corrosion-resistant and heat-resistant metal such as gold or platinum, and then use a device such as an autoclave, so that the product in the highly pressurized capsule undergoes hydrothermal synthesis at a given temperature (100° C.-300° C.) and at a given pressure (0.2 MPa-10 MPa) for a given time, e.g., 2-20 hours. Finally, dry the product to produce $(Zn_{1-x}Mn_xSiO_4$.

The phosphor particles obtained through the hydrothermal synthesis are spherical in shape, and an average particle-diameter is as small as 0.1 µm-2.0 µm. Then, bake this powder in the air at 1100-1300° C. to produce the negatively charged green phosphor. The particle diameter increases to 5-15 µm at this time, and crush this powder with a jet mill into powder of which average particle diameter is 0.1-3 µm. Provide those particles with heat treatment at 400-1000° C. in nitrogen or nitrogen-oxygen, so that the positively charged green phosphor is manufactured.

(2) Charge Positively the $(Zn_{1-x}Mn_x)_2SiO_4$ by Coating

Prepare the powder manufactured by the solid-phase method described in item (1), the powder is baked at 1100-1300° C. and lightly crushed before classified into power having particle diameter of 1-3 µm, i.e., negatively charged $(Zn_{1-x}Mn_x)_2SiO_4$.

Then, put this powder into an isopropyl alcohol solution of magnesium acetyl acetone (solution containing 0.0016% of magnesium acetyl acetone), and agitate the solution before removing the alcohol. Next, bake the solution at 900° C., and then coat the baked product with MgO in 8 nm thickness, thereby producing the positively charged green phosphor.

In this case, negatively charged $(Zn_{1-x}Mn_x)_2SiO_4$ is coated with MgO; however, $Al_2O_3$, ZnO, $Y_2O_3$, or $MgAl_2O_4$ can be used instead of MgO. An organometallic compound (alkoxide compound, acetylacetone compound, hydrocarbon compound) containing Al, Zn, Y, and Mg is mixed with non-aqueous solution (alcohol, benzene, cyclohxane) to be a dilute mixed solution, which is coated on $Zn_2SiO_4$ with a thickness not greater than 10 nm.

③ Red Phosphor

Re:$(Y, Gd)_{1-x}BO_3:Eu_X$

In the step of producing a mixed liquid, mix the materials such as yttrium nitrate $Y(NO_3)_3$, gadolinium nitrate $Gd(NO_3)_3$, boric acid $H_3BO_3$, and europium nitrate $Eu(NO_3)_3$ at a molar ratio of 1-X:2:X ($0.05 \leq X \leq 0.20$, and Y:Gd=65:35). Next, provide the mixed liquid with heat treatment in the air at 1200-1350° C. for 2 hours, and then classify the product to obtain the red phosphor.

Re:$Y_{2-x}O_3:Eu_X$

In the step of producing a mixed liquid, mix the materials such as yttrium nitrate $Y(NO_3)_3$, and europium nitrate $Eu(NO_3)_3$, and dissolve this mixture into ion-exchanged water so that the molar ratio becomes 2-X:X ($0.05 \leq X \leq 0.30$). Next, in the hydration step, add a basic-water solution, e.g., ammonia water solution, thereby forming hydration.

Then, in the hydrothermal synthesis step, put this hydration and ion-exchanged water in a vessel made from a corrosion-resistant and heat-resistant metal such as platinum or gold, and then use a device such as an autoclave, so that the product in the highly pressurized vessel undergoes hydrothermal synthesis at a given temperature (100° C.-300° C.) and at a given pressure (0.2 MPa-10 MPa) for a given time, e.g., 3-12 hours. Then, dry the compound thus obtained, thereby producing the desirable $Y_{2-x}O_3:Eu_X$. Then, provide this phosphor with an annealing press in the air at 1300-1400° C. for 2 hours, and classify the annealed product into the red phosphor. The phosphor obtained through the hydrothermal synthesis step has spherical particles whose diameters fall within 0.1-2.0 µm, which is fit to form a phosphor layer of excellent light-emission characteristics.

As discussed above, use of the green phosphor particles, of which $(Zn_{1-x}Mn_x)_2SiO_4$ is positively charged at its surface, can eliminate clogging in the nozzle during the application of the phosphor to the green cells, and also eliminate color-shift as well as address-discharging errors on the panel. As a result, a brightness in displaying all-white can be increased. On the other hand, use of conventional negatively charged green phosphor tends to invite the clogging in the nozzle and lower the brightness of the green cells.

Samples in accordance with the foregoing embodiment are produced for evaluating the PDP of the present invention, and the following experiments are carried out on the samples. Each sample of the PDPs has a 42-inch screen size (rib-pitch=150 m in accordance with HDTV specification), a dielectric-glass layer of 20 µm, a protective film of MgO having a thickness of 0.5 µm, and intervals of 0.08 mm between the display electrode and the display scanning electrode. Discharging gas is filled by a given pressure into the discharging space and contains neon gas predominantly and 5% of xenon gas.

Samples of PDP 1 through PDP 10 employ the green phosphor particles which are produced in the following way. Crush the particles of the negatively charged $(Zn_{1-x}Mn_x)_2SiO_4$ m before annealing, or coat the phosphor of $(Zn_{1-x}Mn_x)_2SiO_4$ with a positively charged oxide. Table 1 shows synthesis conditions of each sample.

TABLE 1

| Sample No. | Amount X of Mn | Particle diameter reduced by crush | Coating material and its thickness | Amount X of Eu | Mfg. method | Amount X of Eu | Mfg. method |
|---|---|---|---|---|---|---|---|
| | | Green phosphor $(Zn_{1-x}Mn_x)_2SiO_4$ | | Red phosphor $(Y,Gd)_{1-x}BO_3:Eu_x$ | | Blue phosphor $Ba_{1-x}MgAl_{10}O_{17}:Eu$ | |
| 1 | X = 0.01 | ×0.9 | No coating | X = 0.1 | Solid-phase reaction | X = 0.03 | Hydrothermal synthesis |
| 2 | X = 0.05 | ×0.5 | " | X = 0.2 | Solid-phase reaction | X = 0.05 | Hydrothermal synthesis |

TABLE 1-continued

| | | | | | | | | |
|---|---|---|---|---|---|---|---|---|
| 3 | X = 0.1 | ×0.1 | " | X = 0.3 | Solid-phase reaction | X = 0.1 | | Hydrothermal synthesis |
| 4 | X = 0.2 | ×0.2 | " | X = 0.15 | Solid-phase reaction | X = 0.2 | | Hydrothermal synthesis |

| | | Green phosphor $(Zn_{1-x}Mn_x)_2SiO_4$ | | | Red phosphor $(Y_{1-x})_2O_3:Eu_x$ | | Blue phosphor $Ba_{1-x-y}Al_{10}O_{17}:Eu_x$ | |
|---|---|---|---|---|---|---|---|---|
| 5 | X = 0.03 | No crush | $Al_2O_3$ 3 nm | X = 0.01 | Hydrothermal synthesis | X = 0.03 y = 0.1 | Solid-phase reaction | |
| 6 | X = 0.1 | " | ZnO 5 nm | X = 0.1 | Hydrothermal synthesis | X = 0.1 y = 0.3 | Solid-phase reaction | |
| 7 | X = 0.1 | " | MgO 10 nm | X = 0.15 | Water solution | X = 0.1 y = 0.5 | Solid-phase reaction | |
| 8 | X = 0.2 | " | $Y_2O_3$ 6 nm | X = 0.2 | Solid-phase reaction | X = 0.2 y = 0.3 | Solid-phase reaction | |
| 9 | " | " | $Al_2O_3$ 5 nm | " | Solid-phase reaction | " | Solid-phase reaction | |
| 10 | X = 0.1 | ×0.5 | $Al_2O_3$ 10 nm | X = 0.15 | Solid-phase reaction | X = 0.1 y = 0.5 | Solid-phase reaction | |
| 11* | " | No crush | No coating | " | Solid-phase reaction | " | Solid-phase reaction | |

*sample No. 11 is used for comparison purpose.

Samples 1-4 are formed of the following materials mixed with each other. The green positively charged phosphor uses $(Zn_{1-x}Mn_x)_2SiO_4$ by crushing the negatively charged green phosphor, the red phosphor uses $(Y, Gd)_{1-x}BO_3:Eu_x$, and the blue phosphor uses $Ba_{1-x}MgAl_{10}O_{17}:Eu_x$. The following factors are changed as shown in table 1: methods of synthesizing the phosphor, replacement ratio of Mn vs. Eu which work as the main role of light-emission, in other words, replacement ratio of Mn vs. Zn, and particle diameters before and after the crush only in the case of the green phosphor.

Samples 5-10 are formed of the following materials mixed with each other. The red phosphor uses $Y_{2-x}O_3:Eu_x$, the green phosphor uses $(Zn_{1-x}Mn_x)_2SiO_4$ coated with a positively charged oxide, and the blue phosphor uses $Ba_{1-x-y}Sr_yMgAl_{10}O_{17}:Eu_x$. As described in the foregoing cases, the following factors are changed in table 1: methods of synthesizing the phosphor, and in the case of green color, the kinds of oxides to be used for coating the $(Zn_{1-x}Mn_x)_2SiO_4$, and a thickness of those oxides.

The phosphor ink, which is used to form the phosphor layer, employs the respective phosphor particles shown in table 1, and is manufactured by mixing the phosphor, resin, solvent and dispersant. During the manufacturing process, the viscosity of each one of the respective phosphor inks is kept in the range of 1,500 CP-50,000 CP at 25° C. It is observed that the respective phosphor layers include the partition walls uniformly painted with the phosphor ink. A nozzle of 100 μm diameter is used, and phosphor particles, whose average diameter falls within 0.1-3.0 μm and maximum diameter is not greater than 8 μm, are used in the respective samples.

Sample No. 11 uses conventional green phosphor-particles whose surface is negatively charged for forming its green phosphor layer.

Experiment 1

On samples 1-10 and comparison sample 11, charge amounts of the green phosphor to reduced iron-powder are examined by the blow-off method. (Refer to Magazine issued by Lighting Academic Society, Vol. 76, 10th published in 1992, page 16-22.)

Experiment 2

A brightness of the panel obtained after the step of manufacturing the panel is measured with a luminance meter when the panel displays white overall, and when the panel displays green.

Experiment 3

A change rate of deterioration in the brightness at the overall-white display and the green display is measured in the following way. Apply 200V to the plasma display device, and apply discharge-maintaining pulses of 50 kHz for 200 hours continuously, and measure the brightness before and after the application of the pulses to find the change rate of deterioration in the brightness, namely, (brightness after the pulse application−brightness before the pulse application)/ (brightness before the pulse application)×100 is calculated.

An address error in address discharging is determined by watching an image on the screen, and if flicker is found even in one place, it is determined that an error occurs.

Experiment 4

Examine whether or not clogging occurs in the nozzle in the following way. Use a nozzle of 100 μm diameter and apply the green phosphor ink through this nozzle for 100 hours continuously.

Table 2 shows the results of experiments 1-4, i.e., brightness of green, change rate of deterioration in the brightness of green, and clogging in the nozzle.

TABLE 2

| Sample No. | Amount of charges to phosphor by blow-off method Green | Brightness of green phosphor on panel Green | Change rate of brightness before and after applying pulses of 200 V, 50 kHz | | Address error in address discharging | Clogging test by applying green ink through the nozzle for 100 hours continuously |
|---|---|---|---|---|---|---|
| | | | Overall white | Green | | |
| 1 | +0.01 | 250 | −2.2 | −1.4 | N/A | No clogging |
| 2 | +0.03 | 258 | −2.1 | −1.0 | " | " |
| 3 | +0.15 | 232 | −2.2 | −0.9 | " | " |
| 4 | +0.10 | 240 | −2.0 | −0.8 | " | " |
| 5 | 0.0 | 248 | −2.2 | −1.1 | " | " |
| 6 | +0.04 | 245 | −2.3 | −1.0 | " | " |
| 7 | +0.06 | 243 | −2.1 | −1.2 | " | " |
| 8 | +0.02 | 237 | −2.3 | −1.1 | " | " |
| 9 | +0.05 | 230 | −2.4 | −1.2 | " | " |
| 10 | +0.5 | 250 | −2.0 | −0.3 | " | " |
| 11* | −1.5 | 205 | −20.5 | −15.6 | Error | Error in 4 hours |

*sample No. 11 is used for comparison purpose.

As shown in table 2, comparison sample 11 employing negatively charged $(Zn_{1-x}Mn_x)_2SiO_4$, as it is, used in the panel shows a greater change-rate of deterioration in green brightness at the accelerated life test because it is negatively charged. In particular, at the test of applying pulses of 200V, 50 kHz in all-white display, sample 11 shows the change rate of −20.5%. Samples 1-10 which use the positively charged green phosphor, on the other hand, show the change rates as low as between −2.0% and −2.4% in an all-white display. While sample 11 shows the change rate at −15.6% in green display, samples 1-10 show their changes rates between −0.3% and −1.4%, and yet, no address errors or no clogging in applying the phosphor are found.

This is because the green phosphor of negatively charged $(Zn_{1-x}Mn_x)_2SiO_4$ is changed to being positively charged, so that the phosphor becomes resistant to shocks of positive ions such as neon-ion ($Ne_+$) or $CH_2$-based ions ($CH_{x^+}$) existing in the discharging space of the panel. As a result, the brightness deteriorates in a smaller amount. The reason why the address errors are eliminated is that the green phosphor is positively charged, which is the same as the red and blue, so that a uniform address-discharge is obtained. The reason why clogging in a nozzle is eliminated is that ethyl cellulose in the binder is attached easily to the positively charged green phosphor, so that the dispersibility of the phosphor ink improves.

INDUSTRIAL APPLICABILITY

The green phosphor of $(Zn_{1-x}Mn_x)_2SiO_4$, which is one of the elements of the phosphor layer, is positively charged. Phosphor particles whose green phosphor crystals are positively or zero charged are used for forming the green phosphor layer, so that a uniformly applied phosphor layer uniformly applied is obtainable, and deterioration in brightness can be prevented. At the same time, the brightness, service life, and reliability of the PDP can be improved.

The invention claimed is:

1. A method of manufacturing a plasma display device, said method comprising painting at least one of a plurality of discharging cells of the plasma display device with a green phosphor ink comprising a resin component including ethyl cellulose, a solvent component including at least one of terpineol, butyl carbitol-acetate and pentanediol, and a positively or zero charged $Zn_2SiO_4$:Mn green phosphor, wherein the phosphor is produced by crushing a negatively charged $Zn_2SiO_4$:Mn green phosphor until the diameter of the crushed phosphor is 0.9 times the diameter of the phosphor before the phosphor is crushed or less, and then heat-treating the crushed phosphor at 400 to 1,000° C. in a nitrogen atmosphere or a nitrogen-oxygen atmosphere.

2. A method of manufacturing positively or zero charged Zn2SiO4:Mn green phosphor for ink jet painting of discharging cells of a plasma display panel trough a nozzle, said method comprising:

producing a mixed liquid by mixing water with a Zn organometallic salt or nitrate, a Mn organometallic salt or nitrate, and a Si organometallic salt or nitrate, where a molar amount of Si in the liquid is greater than a theoretical ratio required to form $Zn_2SiO4$:Mn, and then hydrolyzing the liquid to form a co precipitate;

drying the co precipitate;

baking the dried co precipitate at 1100 to 1300° C.;

crushing the baked co precipitate until the diameter of the crushed co precipitate is 0.9 times the diameter of the baked co precipitate before the baked co precipitate is crushed or less; and annealing the crushed co precipitate at 400-1000° C. in a nitrogen atmosphere or a nitrogen-oxygen atmosphere.

3. A method of manufacturing positively or zero charged Zn2SiO4:Mn green phosphor for ink jet painting of discharging cells of a plasma display panel through a nozzle, said method comprising:

producing a mixed liquid by mixing water with Zn nitrate, Mn nitrate and silicon dioxide, where a molar amount of Si in the liquid is greater than a theoretical ratio required to form $Zn_2SiO4$:Mn, and the amount of zinc and manganese nitrates form a phosphor having the formula $Zn_{2-x}Mn_xSiO4$, where x is 0.01-0.2;

mixing the liquid with a basic water solution to produce a hydration product;

hydrothermally treating the hydration product at a pressure of 0.2 MPa to 10 MPa and at 100 to 300° C.;

producing green phosphor by baking the hydrothermally treated hydration product at 1100 to 1300° C.;

crushing the green phosphor with one of a ball mill or a jet mill such that an average particle size is reduced to 0.1 μm to 3 μm and until the diameter of the crushed phosphor is 0.9 times the diameter of the phosphor before the phosphor is crushed or less; and annealing the crushed green phosphor at 400° C. to 1000° C. in a nitrogen atmosphere or a nitrogen-oxygen atmosphere.

* * * * *

UNITED STATES PATENT AND TRADEMARK OFFICE
CERTIFICATE OF CORRECTION

PATENT NO. : 7,232,530 B2  
APPLICATION NO. : 10/476691  
DATED : June 19, 2007  
INVENTOR(S) : Hiroyuki Kawamura et al.

It is certified that error appears in the above-identified patent and that said Letters Patent is hereby corrected as shown below:

In column 16, claim 1, line 31, please change "1,000°C." to -- 1000°C --.

In column 16, claim 2, line 44, please change "1300°C.;" to -- 1300°C; --.

In column 16, claim 2, line 49, please change "1000°C." to -- 1,000°C --.

In column 16, claim 3, line 64, please change "300°C.;" to -- 300°C; --.

In column 16, claim 3, line 66, please change "1300°C.;" to -- 1300°C; --.

In column 18, claim 3, lines 1-2, please change "400°C. to 1000°C." to -- 400°C to 1000°C --.

Signed and Sealed this

Eighteenth Day of September, 2007

JON W. DUDAS  
*Director of the United States Patent and Trademark Office*